(12) United States Patent
Swaroop et al.

(10) Patent No.: US 11,518,671 B2
(45) Date of Patent: Dec. 6, 2022

(54) REAL-TIME DETERMINATION OF METER DRIFT VIA LOSS QUALIFICATION AND QUANTIFICATION

(71) Applicant: Wayne Fueling Systems LLC, Austin, TX (US)

(72) Inventors: Prem Swaroop, Arlington, MA (US); Atish Kamble, Arlington, MA (US); Bodhayan Dev, Marlborough, MA (US)

(73) Assignee: Wayne Fueling Systems LLC, Austin, TX (US)

(*) Notice: Subject to any disclaimer, the term of this patent is extended or adjusted under 35 U.S.C. 154(b) by 0 days.

(21) Appl. No.: 17/144,940

(22) Filed: Jan. 8, 2021

(65) Prior Publication Data

US 2021/0403312 A1 Dec. 30, 2021

Related U.S. Application Data

(60) Provisional application No. 63/046,345, filed on Jun. 30, 2020.

(51) Int. Cl.
*B67D 7/08* (2010.01)
*G01F 25/10* (2022.01)

(52) U.S. Cl.
CPC ............. *B67D 7/085* (2013.01); *G01F 25/15* (2022.01); *G01F 25/13* (2022.01)

(58) Field of Classification Search
None
See application file for complete search history.

(56) References Cited

U.S. PATENT DOCUMENTS

| 5,400,253 | A | 3/1995 | O'Connor |
| 6,092,410 | A | 7/2000 | Kaehler et al. |
| 6,996,485 | B2 | 2/2006 | Payne |
| 9,354,091 | B2 | 5/2016 | Vaissiere |
| 9,558,453 | B1 | 1/2017 | Chaudhary et al. |
| 10,606,285 | B2 | 3/2020 | Ding |

(Continued)

FOREIGN PATENT DOCUMENTS

| AU | 2012244083 A1 | 11/2012 |
| CN | 108108832 B | 10/2018 |

(Continued)

OTHER PUBLICATIONS

International Search Report and Written Opinion received for Application No. PCT/US2021/039592 dated Oct. 21, 2021, 13 pages.

(Continued)

*Primary Examiner* — Paul M. West
*Assistant Examiner* — Mark A Shabman
(74) *Attorney, Agent, or Firm* — Mintz Levin Cohn Ferris Glovsky and Popeo, PC; Lisa Adams

(57) ABSTRACT

In one aspect, data characterizing a fuel storage facility can be received from a sensor in operable communication with the fuel storage facility. An estimate of meter drift of a flow meter of a fuel dispenser in fluid communication with the fuel storage facility can be determined based on the received data. The estimate of meter drift can be determined based on at least one predictive model that predicts whether a calibration parameter characterizing a calibration of the flow meter has deviated from a predetermined flow meter calibration parameter. The estimate of meter drift can be provided.

20 Claims, 4 Drawing Sheets

(56) References Cited

U.S. PATENT DOCUMENTS

| | | | |
|---|---|---|---|
| 2002/0049549 | A1 | 4/2002 | Rogers et al. |
| 2008/0125930 | A1 | 5/2008 | Johnson |
| 2008/0295568 | A1* | 12/2008 | Nanaji ................... B67D 7/085 |
| | | | 73/1.34 |
| 2013/0199262 | A1 | 8/2013 | Nielson et al. |
| 2017/0074706 | A1* | 3/2017 | Heide ....................... G01F 1/58 |
| 2018/0037451 | A1 | 2/2018 | Johnson et al. |
| 2018/0044159 | A1 | 2/2018 | Crouse et al. |
| 2018/0300639 | A1 | 10/2018 | Abbas |
| 2021/0404904 | A1 | 12/2021 | Swaroop et al. |

FOREIGN PATENT DOCUMENTS

| | | | |
|---|---|---|---|
| WO | 2006032873 | A1 | 3/2006 |
| WO | 2022006090 | A1 | 1/2022 |
| WO | 2022006110 | A1 | 1/2022 |

OTHER PUBLICATIONS

International Search Report and Written Opinion received for Application No. PCT/US2021/039618, dated Oct. 22, 2021, 14 Pages.

International Search Report and Written Opinion for International Patent Application No. PCT/US21/73085, dated Apr. 7, 2022, 12 pages.

* cited by examiner

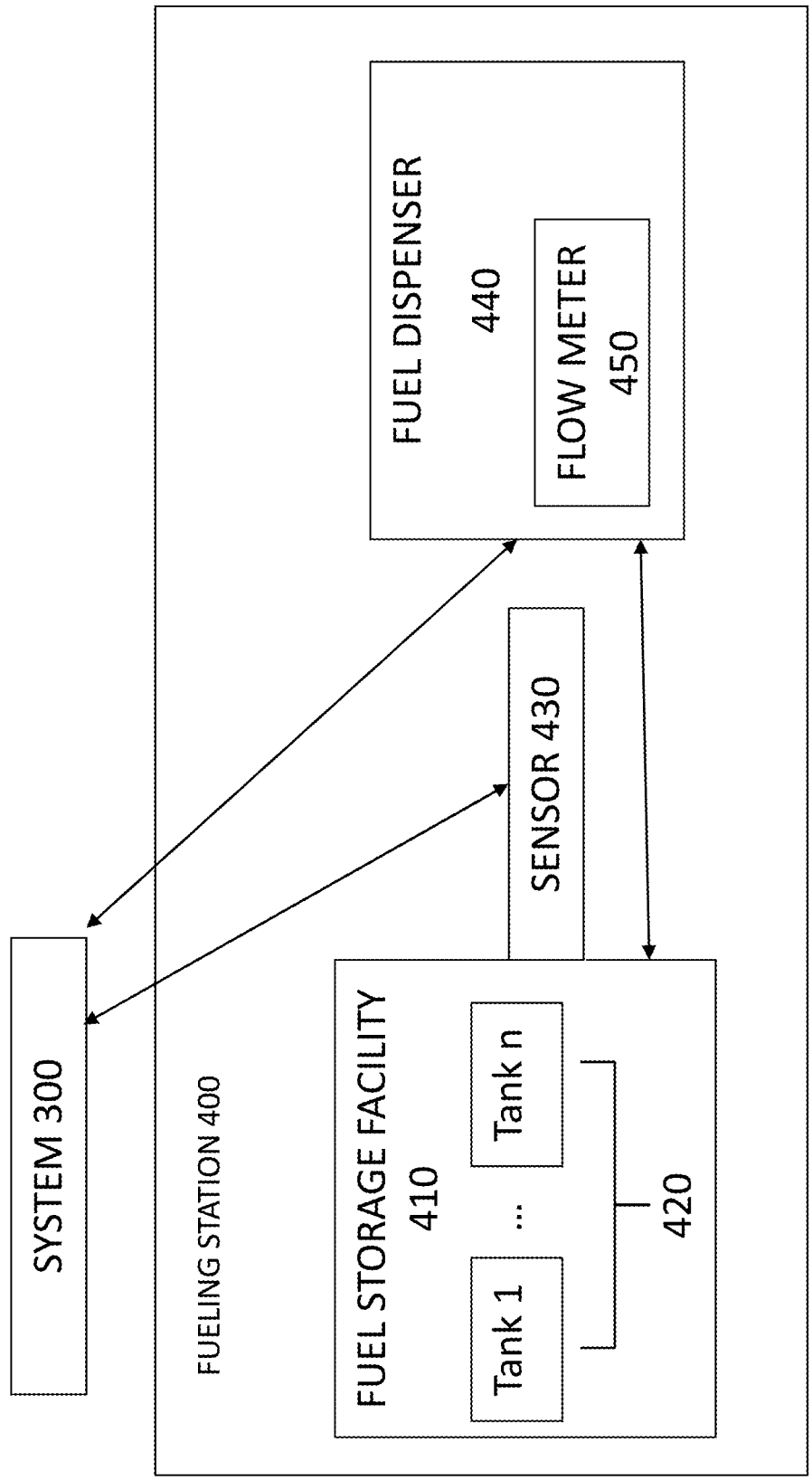

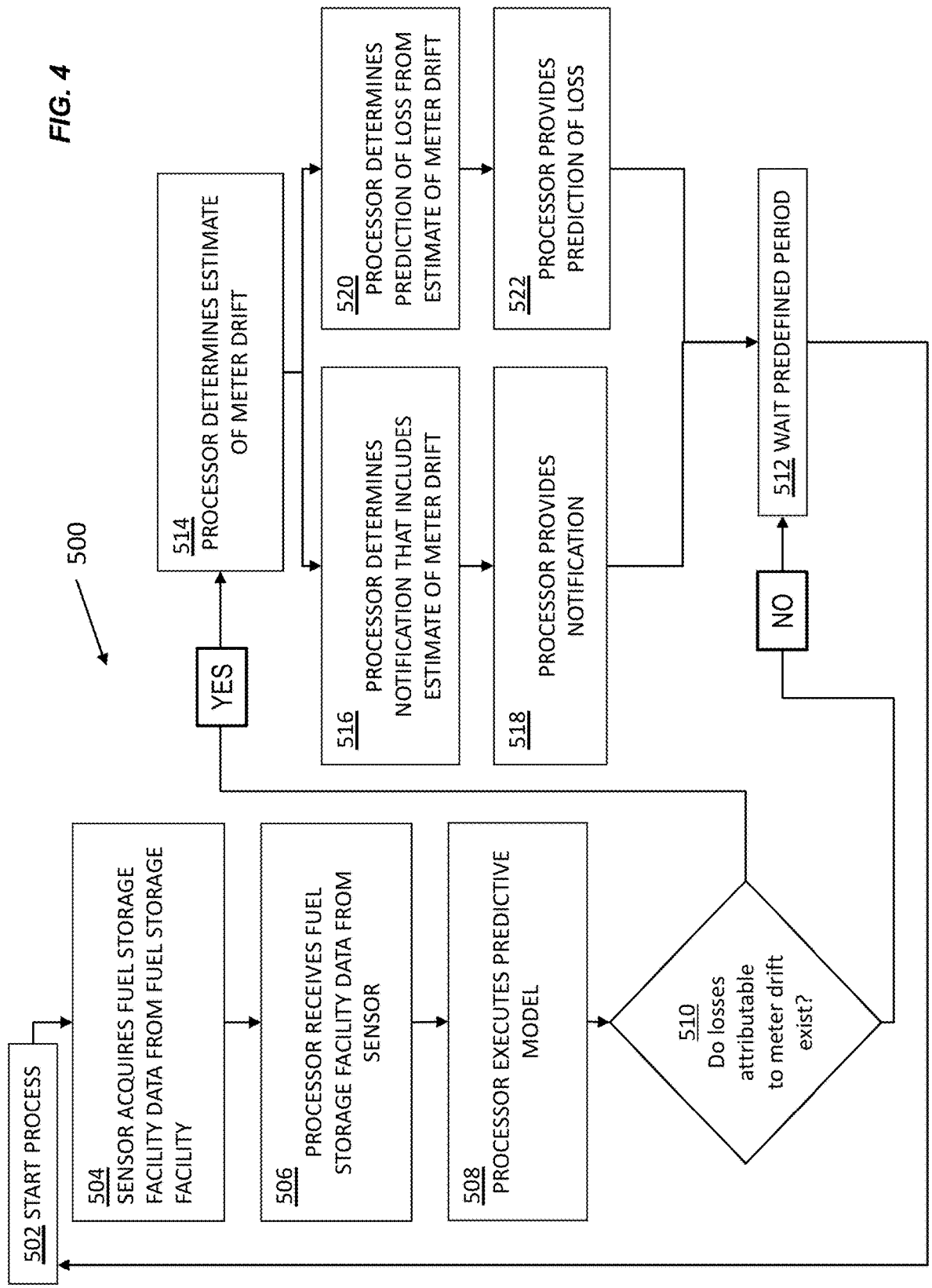

REAL-TIME DETERMINATION OF METER DRIFT VIA LOSS QUALIFICATION AND QUANTIFICATION

CROSS-REFERENCE TO RELATED APPLICATIONS

This application claims priority to U.S. Provisional Patent Application No. 63/046,345, filed Jun. 30, 2020, and entitled "FUEL LEAK DETERMINATION VIA PREDICTIVE MODELING," which is incorporated herein by reference in its entirety.

FIELD

Systems and methods are provided for the real-time determination of meter drift via loss quantification and qualification. Related apparatus, techniques, and articles are also described.

BACKGROUND

An aspect of fuel dispenser operation during a fueling transaction is that the fuel dispenser can accurately provide a desired amount of fuel to a fueling station customer. The fuel dispenser may typically include a flow meter that is responsible for measuring the amount of fuel provided to the fueling station customer during the fueling transaction. The flow meter is accurately calibrated, usually on an annual basis, and certified as such by applicable regulatory agencies to ensure that the fuel dispenser accurately provides the desired amount of fuel to the fueling station customer.

At present, fueling stations rely on annual or periodic calibration of a fuel dispenser flow meter to ensure that the accuracy of fuel dispensing is maintained, and assume that the calibration of a fuel dispenser flow meter is relatively stable between calibrations. However, it is known that occasionally the calibration of the flow meter responsible for ensuring the accurate dispensing of fuel may deviate from its proper parameter (which is referred to as "meter drift") in between calibration. When this occurs, the fuel dispenser does not accurately dispense the desired amount of fuel, which can cause a loss either to the fueling station customer or to the fueling station depending on the direction of calibration drift from the proper calibration parameter. Additionally, this may also impact fueling station inventory reconciliation, which may result in inaccurate estimates of leaks from one or more fueling tanks located at a fueling station, environmental contamination, damaged reputation, and public health risks. In addition, this may result in a lack of compliance with applicable environmental protection laws, which could result in heavy penalties issued to the fueling station owner from applicable regulatory agencies. Although these losses may be small, the magnitude of these impacts increases as the time between the onset of the meter drift and the detection of the meter drift increases. And, at present, some conventional systems for the monitoring of wetstock at fueling stations do not provide the ability to readily detect losses associated with meter drift on a more regular basis.

SUMMARY

Systems and methods are provided for the real-time determination of meter drift via loss quantification and qualification. Related apparatus, techniques, and articles are also described.

In one aspect, data characterizing a fuel storage facility can be received from a sensor in operable communication with the fuel storage facility. An estimate of meter drift of a flow meter of a fuel dispenser in fluid communication with the fuel storage facility can be determined based on the received data. The estimate of meter drift can be determined based on at least one predictive model that predicts whether a calibration parameter characterizing a calibration of the flow meter has deviated from a predetermined flow meter calibration parameter. The estimate of meter drift can be provided.

One or more of the following features can be included in any feasible combination. For example, the at least one predictive model can include a predetermined calibration parameter for the fuel storage facility, a physics model for the fuel storage facility, and an error model indicative of at least one degree of error in the data. For example, a meter drift loss quantity prediction can be determined for the fuel storage facility, and the determining of the meter drift loss quantity prediction can be based on the received data, the determined calibration parameter for the fuel storage facility, the physics model, and an optimization of the error model. For example, the sensor can include one or more of a dipstick, an automated tank gauge, a fuel leak detection sensor, a magnetostrictive probe, a point of sale device, a forecourt controller, a back office system, and/or a fuel dispenser. For example, the data characterizing the fuel storage facility can include one or more of an indication of leakage and/or a rate of leakage per unit time of fuel from the fuel storage facility to the surrounding environment, environmental parameters of the fuel storage facility, an amount of fuel added to the fuel storage facility as a result of a delivery of fuel from a fuel supplier to the fuel storage facility, and/or an amount of fuel removed from the fuel storage facility as a result of a sale of fuel to a customer. For example, the estimate of meter drift can be provided to a graphical user interface of a display communicatively coupled to the server, and the graphical user interface can be configured to present a visual characterization of the meter drift loss quantity prediction on the display. For example, the estimate of meter drift can be provided to a graphical user interface of a display communicatively coupled to the server, the graphical user interface can be configured to present a visual characterization of the estimate of meter drift on the display. For example, the estimate of meter drift can be determined at a repeatable time interval. For example, the physics model can be a fluid balance model. For example, the determining can be based on mathematical programing and can include maximizing or minimizing a function characterized by the physics model and by at least varying input values of the function, the input valves characterizing the received data, and computing an output value of the function, the output value characterizing the estimate of meter drift.

In another aspect, a system is provided and can include at least one data processor and memory storing instructions configured to cause the at least one data processor to perform operations described herein. The operations can include receiving, from a sensor in operable communication with a fuel storage facility, data characterizing the fuel storage facility; determining, based on the received data, an estimate of meter drift of a flow meter of a fuel dispenser in fluid communication with the fuel storage facility, the determining further based on at least one predictive model that predicts whether a calibration parameter characterizing a calibration of the flow meter has deviated from a predetermined flow meter calibration parameter; and providing the estimate of meter drift.

One or more of the following features can be included in any feasible combination. For example, the at least one predictive model can include a predetermined calibration parameter for the fuel storage facility, a physics model for the fuel storage facility, and an error model indicative of at least one degree of error in the data. For example, the operations can further include determining a meter drift loss quantity prediction for the fuel storage facility, and the determining of the meter drift loss quantity prediction can be based on the received data, the predetermined calibration parameter for the fuel storage facility, the physics model, and an optimization of the error model. For example, the sensor can include one or more of a dipstick, an automated tank gauge, a fuel leak detection sensor, a magnetostrictive probe, a point of sale device, a forecourt controller, a back office system, and/or a fuel dispenser. For example, the data characterizing the fuel storage facility can include one or more of an indication of leakage and/or a rate of leakage per unit time of fuel from the fuel storage facility to the surrounding environment, environmental parameters of the fuel storage facility, an amount of fuel added to the fuel storage facility as a result of a delivery of fuel from a fuel supplier to the fuel storage facility, and/or an amount of fuel removed from the fuel storage facility as a result of a sale of fuel to a customer. For example, the estimate of meter drift can be provided to a graphical user interface of a display communicatively coupled to the server, and the graphical user interface can be configured to present a visual characterization of the meter drift loss quantity prediction on the display. For example, the physics model can be a fluid balance model. For example, the determining can be based on mathematical programing and can include maximizing or minimizing a function characterized by the physics model and by at least varying input values of the function, the input valves characterizing the received data, and computing an output value of the function, the output value characterizing the estimate of meter drift. For example, the operations can further include determining the estimate of meter drift at a repeatable time interval.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

The embodiments herein may be better understood by referring to the following description in conjunction with the accompanying drawings in which like reference numerals indicate identically or functionally similar elements, of which:

FIG. 3 is a schematic diagram of a fueling station that is in operable communication with the system of FIG. 2; and FIG. 4 is a flow diagram that demonstrates an exemplary process for determining an estimate of meter drift and a prediction of loss associated with meter drift.

It should be understood that the above-referenced drawings are not necessarily to scale, presenting a somewhat simplified representation of various preferred features illustrative of the basic principles of the disclosure. The specific design features of the present disclosure, including, for example, specific dimensions, orientations, locations, and shapes, will be determined in part by the particular intended application and use environment.

DETAILED DESCRIPTION

An aspect of fuel dispenser operation during a fueling transaction is that the fuel dispenser can accurately provide a desired amount of fuel to a fueling station customer. At present, fueling stations rely on annual or periodic calibration of a fuel dispenser flow meter to ensure that the accuracy of fuel dispensing is maintained, and assume that the calibration of a fuel dispenser flow meter is relatively stable between calibrations. However, it is known that occasionally the calibration of the flow meter responsible for ensuring the accurate dispensing of fuel may deviate from its proper parameter (which is referred to as "meter drift") in between calibration. The current subject matter includes a methodology that, in some implementations, can detect a drift in the calibration of a flow meter of a fuel dispenser (known as "meter drift") based on wetstock inventory reconciliation data that is collected at a fueling station on a daily basis. The methodology can accurately track underground storage tank volumetric calibrations, thermal expansion of fluid due to variations in ambient conditions, seasonal effects, short-deliveries (or potential frauds), and short-sales (or leakage in dispenser nozzles, theft). This methodology can include physics based fluid balancing that uses modeling of inventory and predictive modeling techniques to reduce sources of error in meter drift detection and to quantify the losses associated with meter drift.

Physics based fluid balancing can include predicting temperature-adjusted starting and ending levels of fuel in the fuel storage facility over a given period of time and accounting for sales of fuel from the fuel storage facility and deliveries of fuel to the fuel storage facility, and leakage from the fuel storage facility during the given period of time. By employing physics based fluid balancing and predictive modeling techniques that account for sources of error and discrepancies that the physics based fluid balancing cannot account for by itself, some implementations of the methodology can provide a prediction of losses attributable to meter drift of a fuel dispenser flow meter in fluid communication with the fuel storage facility.

Figure 1:
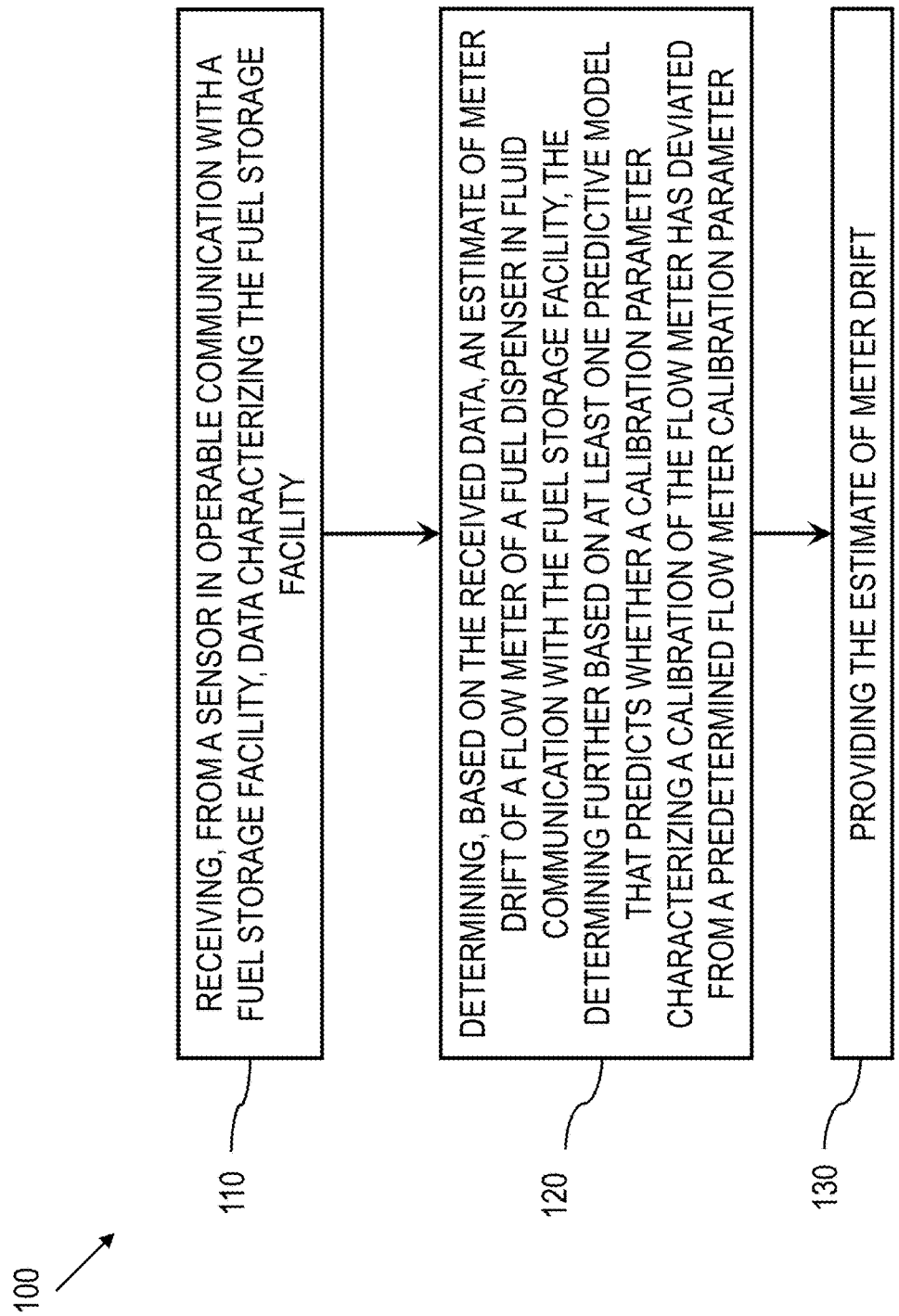
FIG. 1 is a process flow diagram illustrating an example process of some implementations of the current subject matter that can provide for real-time determination of meter drift via loss quantification and qualification.

FIG. 1 is a process flow diagram illustrating an example process 100 of some implementations of the current subject matter that can provide for the real-time determination of meter drift via loss quantification and qualification.

At 110, data characterizing a fuel storage facility can be received from a sensor that is in operable communication with the fuel storage facility. The sensor can, in some implementations, be configured to determine a level of fuel stored in the fuel storage facility, and the data characterizing the storage facility can include the level of fuel stored in the fuel storage facility. In some implementations, the sensor can be configured to measure a temperature of the fuel stored in the fuel storage facility, and the data characterizing the storage facility can include the temperature of the fuel stored in the fuel storage facility.

In some implementations, the sensor can include a dipstick, magnetostrictive probe, and/or an automated tank gauge configured to measure the level of fuel stored in the fuel storage facility. In some implementations, the sensor can include a fuel leak detection sensor configured to determine whether the fuel storage facility is leaking fuel to the environment surrounding the fuel storage facility, and the data characterizing the fuel storage facility can include one or more of an indication of leakage and/or a rate of leakage per unit time of fuel from the fuel storage facility to the surrounding environment. In some implementations, the sensor can include any one of a point of sale device, a forecourt controller, a back office system, and a fuel dispenser, each of which can be in operable communication with the fuel storage facility and can be configured to record environmental parameters of the fuel storage facility (e.g., ambient temperature, etc.) and the fuel stored therein (e.g., temperature, fuel level, etc.), and the data characterizing the fuel storage facility can include the environmental parameters of the fuel storage facility (e.g., ambient temperature, etc.) and the fuel stored therein (e.g., temperature, fuel level, etc.). In some implementations, the sensor can be configured to determine an amount of fuel added to the fuel storage facility as a result of a delivery of fuel from a fuel supplier to the fuel storage facility, and the data characterizing the fuel storage facility can include amount of fuel added to the fuel storage facility as a result of a delivery of fuel from a fuel supplier to the fuel storage facility. In some implementations, the sensor can be configured to determine an amount of fuel removed from the fuel storage facility as a result of a sale of fuel to a customer, and the data characterizing the fuel storage facility can include the amount of fuel removed from the fuel storage facility as a result of a sale of fuel to the customer. In some implementations, the sensor can comprise a plurality of sensors that incorporate one or more aspects of the functionality described above.

In some implementations, the fuel storage facility can be an underground fuel storage tank at a fueling station that is configured to supply fuel dispensers at the fueling station with fuel. In some implementations, the fuel storage facility can comprise a plurality of underground fuel storage tanks, each located at the fueling station, having one or more of the aforementioned sensors in operable communication therewith, and configured to supply fuel dispensers at the fueling station with fuel. In some implementations, the fuel storage facility can be located at a separate location from the fueling station.

In some implementations, the data can be received at a server. In some implementations, the server can include a wetstock management server communicatively coupled to the plurality of sensors that can collect the data. The server can be a remote, e.g., cloud-based, server located away from the fuel storage facility and/or the fueling station, however in some implementations the server can be located at the fuel storage facility and/or the fueling station. In some embodiments, the data received from the one or more of the plurality of sensors can be collected by an intermediary data collection device (not shown), such as an internet of things (IoT) or edge device, located on-site, and the data collection device can transmit the collected data to the server for processing.

In some implementations, the data received from the sensor can characterize one or more aspects of the fuel storage facility for a designated period of time (e.g., a day). For example, in some implementations, the data can characterize an amount of fuel present in the fuel storage facility at a start time of the designated period of time, an amount of fuel added to the fuel storage facility by the delivery of fuel from a fuel supplier, an amount of fuel removed from the fuel storage facility by the sale of fuel to a customer, an amount of fuel present in the fuel storage facility at an end time of the designated period of time, a capacity of the fuel storage facility, a type of fuel stored in the fuel storage facility, a grade of fuel stored in the fuel storage facility, ambient weather, temperature, and/or pressure conditions at the fuel storage facility, and a type of sensor disposed at the fuel storage facility. In some implementations, when the fuel storage facility comprises a plurality of fuel tanks, the data can characterize whether the plurality of fuel tanks are in fluid communication with some or all of each other, and the number of fuel tanks that are in fluid communication with one another.

At 120, an estimate of meter drift of a flow meter of a fuel dispenser in fluid communication with the fuel storage facility can be determined based on the received data. The estimate of meter drift can be determined based on at least one predictive model that predicts whether a calibration parameter characterizing a calibration of the flow meter has deviated from a predetermined flow meter calibration parameter. In some implementations, the at least one predictive model can include a predetermined calibration parameter for the fuel storage facility, a physics model for the fuel storage facility, and an error model indicative of at least one degree of error in the data.

In some implementations, the predetermined calibration parameter can include one or more characteristics of the fuel storage facility, such as a tank chart. In some implementations, when the predetermined calibration parameter is non-linear in nature (such as when the predetermined calibration parameter is a tank chart), the predetermined calibration parameter can be approximated, for use by the at least one predictive model, as a piece-wise linear function having a plurality of predetermined breakpoints, and a slope between each of the predetermined breakpoints can be determined by optimization of the error model. However, in some implementations, the predetermined calibration parameter can be approximated using other techniques known to persons of skill in the art. In some implementations, a number of the predetermined breakpoints can also be determined by optimization of the error model. In some implementations, the number of predetermined breakpoints can be determined using machine learning techniques that involve, for example, k-means and gradient boosted trees. In some implementations, the predetermined calibration parameters can include, use, or be based on, data characterizing the fuel storage facility that has been previously obtained.

In some implementations, the physics model can include a fluid balance model that determines a predicted fuel level for the fuel storage facility based on the received data, which can be used to derive an estimate of meter drift of a flow meter of a fuel dispenser in fluid communication with the fuel storage facility. For example, in some implementations, the fluid balance model can predict a starting level of fuel in the fuel storage facility for a given time period based on the starting level of fuel in the fuel storage facility at the beginning of a previous time period, the ending level of fuel in the fuel storage facility at the conclusion of the previous time period, the amount of fuel sold from the fuel storage facility during the previous time period, the amount of fuel delivered to the fuel storage facility during the previous time period, and the amount of fuel that has leaked from the fuel storage facility into the surrounding environment.

In some implementations, the at least one predictive model can account for various errors and discrepancies between the starting level of fuel in the fuel storage facility for a given period of time (e.g., a day) and the ending level of fuel in the fuel storage facility for the given period of time that cannot otherwise be accounted for by sales of fuel from the fuel storage facility during the given period of time and deliveries of fuel from the fuel storage facility during the given period of time. In some implementations, such errors and discrepancies can be the result of meter drift of a flow meter of a fuel dispenser in fluid communication with the fuel storage facility. In some implementations, such errors and discrepancies can be the result of one or more of a leakage of fuel from the fuel storage facility during the given period of time, discrepancies in fuel sales from the fuel storage facility and in fuel deliveries to the fuel storage facility resulting from calculation/measurement errors or theft of fuel, and the like.

In some implementations, the at least one predictive model can account for the errors and discrepancies for a series of periods of time (e.g., a series of days). In some implementations, the at least one predictive model can account for the aforementioned errors and discrepancies by the use of an error model. The error model can include one or more optimizer functions that can be used in conjunction with the physics model by the at least one predictive model to minimize various error correction terms for use in determining an estimate of meter drift with a high degree of accuracy. For example, in some implementations, the error model can minimize a deviation, from 1, of an average correction factor for any multiplicative errors introduced in determining the amount of fuel sales from the fuel storage facility on a given day, and a deviation, from 1, of an average correction factor for any additive errors introduced in determining the amount of fuel delivered on the given day. In some implementations, the error model can minimize a deviation, from 0, of an average leakage value for the fuel storage facility. In some implementations, the error model can minimize a weighted average of each of these deviations and further include error contributions associated with additive correction factors.

In some implementations, the error model can solve one or more linear equations using the minimized cost function and thereby determine the estimate of meter drift for the time period under consideration. In some implementations, the determination of the estimate of meter drift can be further based on mathematical programing and can include maximizing or minimizing a function characterized by the physics model and by at least varying input values of the function that characterizes the received data, and computing an output value of the function that characterizes the estimate of meter drift. In some implementations, the estimate of meter drift can be determined at one or more repeatable time intervals.

In some implementations, the at least one predictive model can receive user-provided parameters for use in determining the estimate of meter drift. In some implementations, the user-provided parameters can include various data quality parameters which can be used by the at least one predictive model to improve the quality of the received data that is used for determining the estimate of meter drift. For example, the data quality parameters can include indications to ignore or remove portions of the data if the predicted estimate of meter drift, as determined by the at least one predictive model, exceeds a certain value. In addition, in some implementations, the data quality parameters can include an artificially-induced parameter that can be used by the at least one predictive model as an accuracy benchmark against the predicted estimate of meter drift determined by the at least one predictive model.

In some implementations, the user-provided parameters can also include error model parameters that can influence the operating characteristics of the error model. For example, in some implementations, the error model parameters can include the fuel delivery error correction weight term, the predicted fuel leakage rate weight term, and/or upper/lower bounds for aspects of the predetermined calibration parameter.

Below is an exemplary mathematical implementation of the predictive model described herein that incorporates the aforementioned predetermined calibration parameter, physics model, and error model. Equation 1 describes a generalized fluid balance equation that can be used by the predictive model in some implementations of the current subject matter that incorporates a predetermined calibration parameter and a physics model:

$$\sum_{k=0}^{j'(i+1)-1} \left( \hat{l}_k * (b_{k+1} - b_k) \right) + \\ \hat{l}_{j'(i+1)} * \left( EL_i * \left(1 - coeff * (\hat{T}_i - \hat{T}_m)\right) - b_{j'(i+1)} \right) = \\ \sum_{k=0}^{j'(i)-1} \left( \hat{l}_k * (b_{k+1} - b_k) \right) + \hat{l}_{j'(i)} * \left( SL_i * \left(1 - coeff * (\hat{T}_i - \hat{T}_m)\right) - b_{j'(i)} \right) - \\ \hat{\delta} S_i + \hat{\varepsilon}_i + D_i - \hat{\lambda}_i$$

Eq. (1)

The parameters and expressions included in Equation (1) are evaluated for a given time window of interest w, and for a number of data points d under consideration in the time window w. $SL_i$ is the starting level of fuel in the fuel storage facility at a particular instant i, $\forall i \in \{1, \ldots d\}$, $EL_i$ is the ending level of fuel in the fuel storage facility at the instant i, $\forall i \in \{1, \ldots d\}$, $S_i$ is the volume of fuel removed from the fuel storage facility due to sales at the instant i, $\forall i \in \{1, \ldots d\}$, $D_i$ is the volume of fuel added to the fuel storage facility due to deliveries at the instant i, $\forall i \in \{1, \ldots, d\}$, $\hat{T}_i$ is the temperature on day i, $\forall i \in \{1, \ldots, d\}$, and $\hat{T}_m$ is the median temperature for the time window w, and coeff is the coefficient of thermal expansion for the fuel.

Each of these aforementioned parameters are known, however, there are some parameters which are not known and can be approximated via use of an optimization model. These parameters include $\hat{\delta}$, which is the correction factor for the multiplicative error in sales measurement, $\hat{\varepsilon}_i$, which is the correction factor for the additive error deliveries measurement at an instant i, $\forall i \in \{1, \ldots, d\}$ (note that $\varepsilon_i$ is zero for all non-delivery data points), and $\hat{\lambda}_i$, which is the leakage at an instant i, $\forall i \in \{1, \ldots, d\}$, which can be either positive or negative depending on whether there is a loss or gain to the fuel storage facility.

As the tank chart for the fuel storage facility is non-linear, the parameters of the tank chart can be approximated with a piece-wise linear function. $b_j$, $\forall j \in \{0, 1, \ldots, n\}$ is a set of n=bks predetermined breakpoints in the piecewise linear correction to the stock level. In particular, $b_1=0$ and $b_n=$full height of the fuel storage facility. $j'(i) \in \{0, 1, \ldots, n-1\}$ can be defined such that $b_{j'(i)}$ is the largest breakpoint that is less than or equal to $SL_i$. $l_j$, $\forall j \in \{0, 1, \ldots n-1\}$ is the slope of the linear piece between $b_j$ and $b_{j+1}$, which is to be determined by the optimization model.

In executing the optimization model, it is assumed that the correction term $\hat{\delta}$ should be close to 1. As such, a first objective of the optimization model is to minimize the difference of the correction term from 1. It is also assumed that the average leakage value $$\hat{\lambda} = \frac{1}{d}\sum_{i=1}^{d} \hat{\lambda}_i$$

and additive corrective term $$\hat{\varepsilon} = \frac{1}{d}\sum_{i=1}^{d} \hat{\varepsilon}_i$$

should be close to 0. As such, a second objective of the optimization model is to minimize its differences for these terms from 0. In some implementations, the optimization model can minimize a weighted average of the two objectives.

Equation 2, provided below, shows a mathematical representation of an error model that can be used by the predictive model in some implementations of the current subject matter to optimize the physics model and thereby provide an accurate estimate of meter drift. For optimizing the current problem, a concrete mathematical model from linear programming is used as the mathematical model can be directly defined with the real-time data values supplied at the time of the model definition.

$$c^{li}\sum_{i=1}^{d} x_i^l + c^{\hat{\varepsilon}} x^{\hat{\varepsilon}} + c^{\varepsilon i}\sum_{i=1}^{d} x_i^{\varepsilon} + c^{\delta} x^{\delta} + c^{\hat{\lambda}} x^{\hat{\lambda}} + c^{\hat{\lambda} i}\sum_{i=1}^{d} x_i^{\hat{\lambda}} \quad (2)$$

Equation (2) is an optimization function featuring various optimizer weights which can be adjusted depending on various data quality parameters. The optimizer weights are defined as:

$$c^{li} = \frac{1}{bks}, c^{\hat{\varepsilon}} = \left(\frac{Nd}{d}\right)*eps, c^{\varepsilon i} = \left(\frac{Nd}{d}\right)*eps, c^{\hat{\lambda}} = \text{lamb},$$

$$c^{\hat{\lambda} i} = \text{lamb}, c^{\delta} = \left(\frac{Ns}{d}\right)*\frac{1}{bks}$$

Such that:

$$\hat{\varepsilon} - 0 \leq x^{\varepsilon}, 0 - \hat{\varepsilon} \leq x^{\varepsilon} \quad (3)$$

$$\hat{\delta} - 1 \leq x^{\delta}, 1 - \hat{\delta} \leq x^{\delta} \quad (4)$$

$$\hat{\lambda} - 0 \leq x^{\lambda}, 0 - \hat{\lambda} \leq x^{\lambda} \sum_{k=0}^{j'(i+1)-1} (\hat{l}_k * (b_{k+1} - b_k)) + \quad (6)$$

$$\hat{l}_{j'(i+1)} * (EL_i * (1 - coeff * (\hat{T}_i - \hat{T}_m)) - b_{j'(i+1)}) =$$

$$\sum_{k=0}^{j'(i)-1} (\hat{l}_k * (b_{k+1} - b_k)) + \hat{l}_{j'(i)} * (SL_i * (1 - coeff * (\hat{T}_i - \hat{T}_m)) - b_{j'(i)}) -$$

$$\hat{\delta} S_i + \hat{\varepsilon}_i + D_i - \hat{\lambda}_i \; \forall \, i \in \{1, \ldots, d\} \text{ (same as Equation (1) above)}$$

$$\hat{\lambda} = \frac{1}{d}\sum_{i=1}^{d} \hat{\lambda}_i \quad (7)$$

$$\hat{\varepsilon} = \frac{1}{d}\sum_{i=1}^{d} \hat{\varepsilon}_i \quad (8)$$

$$-\infty \leq \hat{\lambda}, \hat{\lambda}_1, \ldots, \hat{\lambda}_d \leq \infty \quad (9)$$

$$\hat{\delta} \geq 0 \quad (10)$$

$$-filt \leq \hat{\varepsilon} \leq filt \quad (11)$$

$$-\infty \leq \hat{\lambda} \leq \infty \quad (12)$$

$$\text{beta\_th\_1} \leq \hat{l}_0, \ldots, \hat{l}_{n-1} \leq \text{beta\_th\_u} \quad (13)$$

wherein beta_th_1 is the lower-limit on calibration breakpoint slope and beta_th_u=upper-limit on calibration breakpoint slope, wherein filt and −filt are the limits on additive delivery correction term, wherein Nd is the number of delivery points within the window w, and wherein $N_s$ is the number of data-points, sales are reported within the given window-size. Solving the set of linear equations using the optimizers, the model can evaluate $\hat{\delta} S_i$, which is the corrective term associated with the error/drift in sales due to meter-drift in nozzles. Accordingly, the model can provide for an estimate of meter drift that is associated with one or more flow meters of fuel dispensers in fluid communication with the fuel storage facility.

At 130, the estimate of meter drift can be provided. In some implementations, the estimate of meter drift can be provided to a server that can generate a notification indicative of the estimate of meter drift and provide the notification to an end terminal for further processing and/or display. In some implementations, the server can be a remote server located at a location that is different from that of the fuel storage facility and/or the fuel dispenser. In some implementations, the server can be located at the same location as the fuel storage facility and/or the fuel dispenser (e.g., the fueling station). In some implementations, the end terminal can be located at a location that is different from that of the fuel storage facility and/or the fuel dispenser. In some implementations, the end terminal can be located at the same location as the fuel storage facility and/or the fuel dispenser (e.g., the fueling station). In some implementations, the notification can be a visual alert that is displayed on a display in operable communication with any of the aforementioned servers and end terminals to thereby indicate the possible existence of the meter drift. In some implementations, the estimate of meter drift can be presented in graphical form to an end user, via one or more of the aforementioned displays, by providing graphical determinations of errors associated with the sale of fuel from the fuel storage facility (via the fuel dispensers) and that are indicative of meter drift in the flow meters of the fuel dispensers.

In some implementations, the estimate of meter drift can be provided to a data processor for further processing. The data processor can use the estimate of meter drift to determine a meter drift loss quantity prediction that characterizes an estimated amount of loss associated with meter drift if the meter drift is not immediately corrected.

Figure 2:
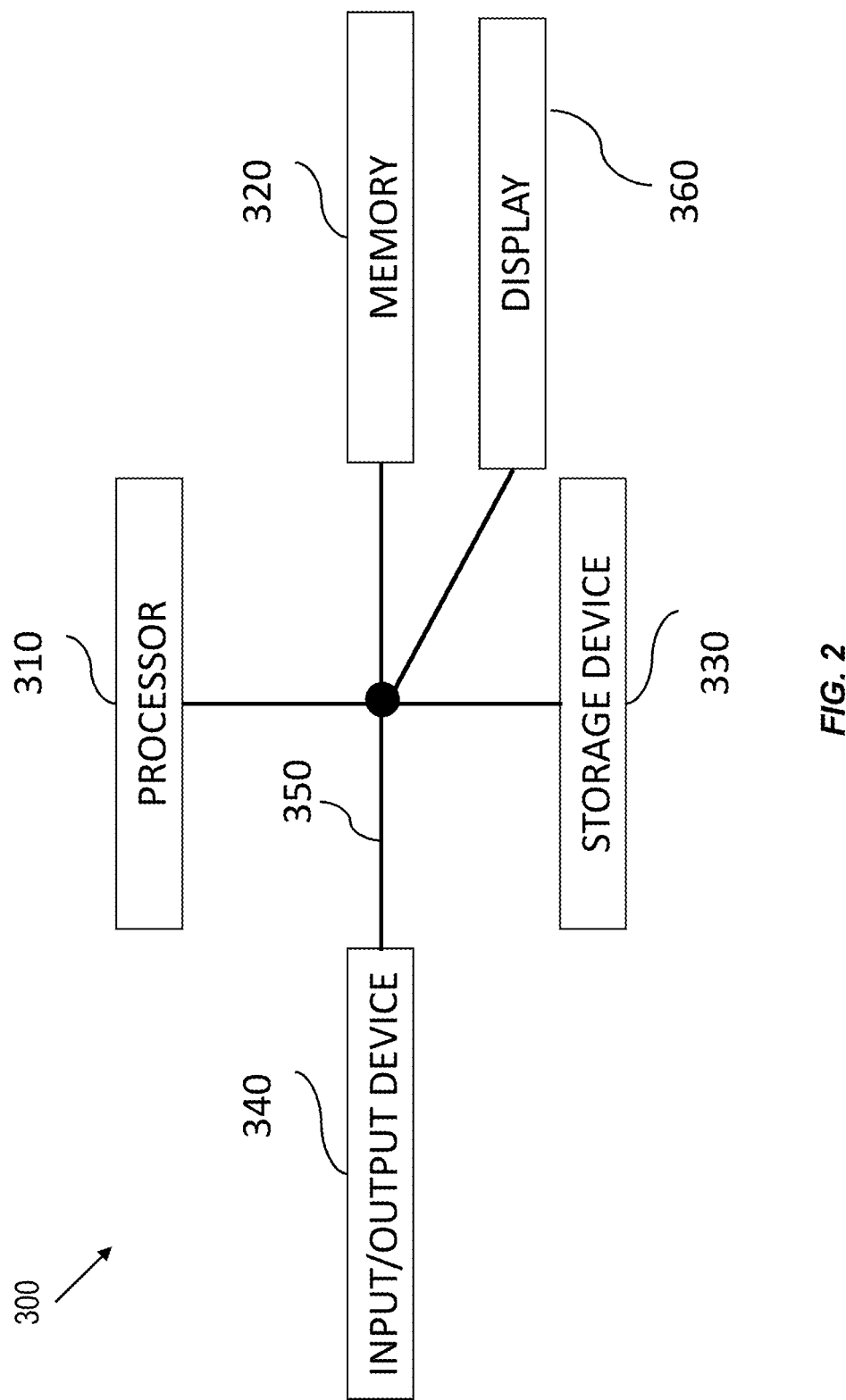
FIG. 2 is a schematic diagram of an exemplary system for implementing the current subject matter, as shown and described herein.

In some implementations, the current subject matter can be configured to be implemented in a system 300, as shown in FIG. 2. The system 300 can include one or more of a processor 310, a memory 320, a storage device 330, and an input/output device 340. Each of the components 310, 320, 330 and 340 can be interconnected using a system bus 350. The processor 310 can be configured to process instructions for execution within the system 100. In some implementations, the processor 310 can be a single-threaded processor. In alternate implementations, the processor 310 can be a multi-threaded processor. The processor 310 can be further configured to process instructions stored in the memory 320 or on the storage device 330, including receiving or sending information through the input/output device 340. The memory 320 can store information within the system 300. In some implementations, the memory 320 can be a computer-readable medium. In alternate implementations, the memory 320 can be a volatile memory unit. In yet some implementations, the memory 320 can be a non-volatile memory unit. The storage device 330 can be capable of providing mass storage for the system 100. In some implementations, the storage device 330 can be a computer-readable medium. In alternate implementations, the storage device 330 can be a floppy disk device, a hard disk device, an optical disk device, a tape device, non-volatile solid state memory, or any other type of storage device. The input/output device 340 can be configured to provide input/output operations for the system 300. In some implementations, the input/output device 340 can include a keyboard and/or pointing device. In alternate implementations, the input/output device 340 can include a display unit for displaying graphical user interfaces. In some implementations, the system 300 can be in operable communication with one or more components of a fueling station 400, as shown in FIG. 3. The fueling station 400 can include a fuel storage facility 410, which may include one or more fuel tanks 420 disposed in the ground at the fueling station 400 that are configured to hold fuel at the fueling station 400. The one or more fuel tanks 420 of the fuel storage facility 410 can be in operable communication with one or more sensors 430 that are located proximate the fuel storage facility 410 and configured to acquire data characterizing the fuel stored in the one or more fuel tanks 420, the one or more fuel tanks 420, and the fuel storage facility 410. The one or more sensors 430 can also be in operable communication with the system 300 such that the system 300 can receive the acquired data for use in determining the estimate of meter drift.

The one or more fuel tanks 420 of the fuel storage facility 410 can also be in fluid and operable communication with a fuel dispenser 440, which can dispense the fuel contained in the one or more fuel tanks to a customer. The fuel dispenser can include a flow meter 450 that is configured to determine a volumetric rate of fuel provided by one or more nozzles of the fuel dispenser to a customer during a fuel dispensing transaction and to provide the volumetric rate of fuel to a processor of the fuel dispenser, which can use the volumetric rate of fuel to determine an amount of fuel dispensed by the one or more nozzles of the fuel dispenser. The fuel dispenser 440 can be in operable communication with the system 300 such that the system 300 can receive data from the fuel dispenser 440 characterizing the amount of fuel provided to the customer from the one or more nozzles during the sale of fuel to the customer, which is based on the volumetric rate of fuel provided by the flow meter 450. This data can be used by the system 300 to determine the estimate of meter drift in accordance with the methods and techniques described elsewhere herein.

FIG. 4 is a flow chart that demonstrates an exemplary process 500 for determining an estimate of meter drift and a prediction of loss associated with meter drift that incorporates some implementations of the current subject matter as described herein. After initiating the process 500 is initiated at step 502, the sensor can, at step 504, acquire the data characterizing the fuel storage facility from the fuel storage facility. At step 506, the data characterizing the fuel storage facility can be received by a processor. The processor can execute a predictive model as described herein, at step 508, to determine various sources of error/loss in the wetstock (e.g., fuel) contained within the fuel storage facility. At step 510, the processor can assess whether any of the determined sources of error/loss can be attributed to meter drift. If one or more of the determined sources of error/loss cannot be attributed to meter drift, the process pauses for a predefined period of time (e.g., a day) at step 512 before restarting again at step 502.

If one or more of the determined sources of error can be attributed to meter drift, the processor can then determine an estimate of meter drift at step 514 and thereby assess whether the calibration of a flow meter in fluid and operable communication with the fuel storage facility has deviated from a predetermined calibration parameter for the flow meter. The processor can then, at step 516, determine a notification that includes the determined estimate of meter drift, and the processor can, at step 518, provide the notification for further use/analysis (e.g., display the notification on a fuel dispenser attendant terminal, send the notification to a server configured to analyze the operations of the fuel dispenser, the fueling station at which the fuel dispenser is located, and/or the fuel storage facility, and the like). In addition, the processor can determine a prediction of loss over time due to meter drift based on the determined estimate of meter drift at step 520, and, at step 522, provide the prediction for further use/analysis (e.g., display the prediction on a fuel dispenser attendant terminal, send the prediction to the server configured to analyze the operations of the fuel dispenser, the fueling station at which the fuel dispenser is located, and/or the fuel storage facility, and the like). When steps 518 and 522 are completed, the process can then pause for a predefined period of time (e.g., a day) at step 512 before restarting again at step 402.

The estimate of meter drift determined by process 500 and other processes/techniques described herein can be a historically-derived estimate. As such, the predictive model can be executed on a repetitive basis (e.g., a real-time or daily basis) using data acquired by the sensor on a repetitive basis (e.g., a real-time or daily basis). As such, by tracking the losses identified via the repetitive (e.g., daily) collection of fuel storage facility data and execution of the predictive model, the process 500 can provide an assessment of whether the calibration of the flow meter is changing over time and thereby causing meter drift. In addition, the prediction of loss over time due to meter drift can be determined on a going-forward basis based on changes in the calibration of the flow meter over time as determined by execution of the predictive model and by the determination of the estimate of meter drift.

It should be noted that the steps shown in FIGS. 1 and 4 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Even further, the illustrated steps may be modified in any suitable manner in accordance with the scope of the present claims.

Accordingly, the system as discussed herein can combine all known alerts and data points, site equipment, and infrastructure details into a model to provide a user with the estimate of meter drift and to quantify losses associated with meter drift. By applying artificial intelligence and machine learning techniques to provide model and parameter recommendations, the detection of flow meter calibration drift can be performed more efficiently, thereby saving costs and improving safety and regulatory compliance.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

One skilled in the art will appreciate further features and advantages of the invention based on the above-described embodiments. Accordingly, the invention is not to be limited by what has been particularly shown and described, except as indicated by the appended claims. All publications and references cited herein are expressly incorporated herein by reference in their entirety.

What is claimed is:

1. A method comprising:
   receiving, from a sensor in operable communication with a fuel storage facility, data characterizing the fuel storage facility;
   determining, based on the received data, an estimate of meter drift of a flow meter of a fuel dispenser in fluid communication with the fuel storage facility and separate from the fuel storage facility, the determining further based on at least one predictive model that predicts whether a calibration parameter characterizing a calibration of the flow meter has deviated from a predetermined flow meter calibration parameter; and
   providing the estimate of meter drift.

2. The method of claim 1, wherein the at least one predictive model includes a predetermined calibration parameter for the fuel storage facility, a physics model for the fuel storage facility, and an error model indicative of at least one degree of error in the data.

3. The method of claim 2, further comprising:
   determining a meter drift loss quantity prediction for the fuel storage facility, the determining of the meter drift loss quantity prediction based on the received data, the predetermined calibration parameter for the fuel storage facility, the physics model, and an optimization of the error model.

4. The method of claim 3, wherein the estimate of meter drift is provided to a graphical user interface of a display, the graphical user interface configured to present a visual characterization of the meter drift loss quantity prediction on the display.

5. The method of claim 2, wherein the physics model is a fluid balance model.

6. The method of claim 2, wherein the determining further includes maximizing or minimizing a function characterized by the physics model.

7. The method of claim 1, wherein the sensor includes one or more of a dipstick, an automated tank gauge, a fuel leak detection sensor, a magnetostrictive probe, a point of sale device, a forecourt controller, a back office system, and/or a fuel dispenser.

8. The method of claim 1, wherein the data characterizing the fuel storage facility includes one or more of an indication of leakage and/or a rate of leakage per unit time of fuel from the fuel storage facility to the surrounding environment, environmental parameters of the fuel storage facility, an amount of fuel added to the fuel storage facility as a result of a delivery of fuel from a fuel supplier to the fuel storage facility, and/or an amount of fuel removed from the fuel storage facility as a result of a sale of fuel to a customer.

9. The method of claim 1, wherein the estimate of meter drift is provided to a graphical user interface of a display, the graphical user interface configured to present a visual characterization of the estimate of meter drift on the display.

10. The method of claim 1, further comprising determining the estimate of meter drift at a repeatable time interval.

11. A system comprising:
at least one data processor; and
memory storing instructions configured to cause the at least one data processor to perform operations comprising:
receiving, from a sensor in operable communication with a fuel storage facility, data characterizing the fuel storage facility;
determining, based on the received data, an estimate of meter drift of a flow meter of a fuel dispenser in fluid communication with the fuel storage facility and separate from the fuel storage facility, the determining further based on at least one predictive model that predicts whether a calibration parameter characterizing a calibration of the flow meter has deviated from a predetermined flow meter calibration parameter; and
providing the estimate of meter drift.

12. The system of claim 11, wherein the at least one predictive model includes a predetermined calibration parameter for the fuel storage facility, a physics model for the fuel storage facility, and an error model indicative of at least one degree of error in the data.

13. The system of claim 12, wherein the operations further comprise:
determining a meter drift loss quantity prediction for the fuel storage facility, the determining of the meter drift loss quantity prediction based on the received data, the predetermined calibration parameter for the fuel storage facility, the physics model, and an optimization of the error model.

14. The system of claim 13, wherein the estimate of meter drift is provided to a graphical user interface of a display, the graphical user interface configured to present a visual characterization of the meter drift loss quantity prediction on the display.

15. The system of claim 12, wherein the physics model is a fluid balance model.

16. The system of claim 12, wherein the determining further includes maximizing or minimizing a function characterized by the physics model.

17. The system of claim 11, wherein the sensor includes one or more of a dipstick, an automated tank gauge, a fuel leak detection sensor, a magnetostrictive probe, a point of sale device, a forecourt controller, a back office system, and/or a fuel dispenser.

18. The system of claim 11, wherein the data characterizing the fuel storage facility includes one or more of an indication of leakage and/or a rate of leakage per unit time of fuel from the fuel storage facility to the surrounding environment, environmental parameters of the fuel storage facility, an amount of fuel added to the fuel storage facility as a result of a delivery of fuel from a fuel supplier to the fuel storage facility, and/or an amount of fuel removed from the fuel storage facility as a result of a sale of fuel to a customer.

19. The system of claim 11, wherein the operations further comprise determining the estimate of meter drift at a repeatable time interval.

20. A non-transitory computer program product storing instructions which, when executed by at least one data processor forming part of at least one computing system, cause the at least one data processor to implement operations comprising:
receiving, from a sensor in operable communication with a fuel storage facility, data characterizing the fuel storage facility;
determining, based on the received data, an estimate of meter drift of a flow meter of a fuel dispenser in fluid communication with the fuel storage facility and separate from the fuel storage facility, the determining further based on at least one predictive model that predicts whether a calibration parameter characterizing a calibration of the flow meter has deviated from a predetermined flow meter calibration parameter; and
providing the estimate of meter drift.

* * * * *